(12) United States Patent
Kitahara et al.

(10) Patent No.: US 8,379,256 B2
(45) Date of Patent: Feb. 19, 2013

(54) ELECTRONIC APPARATUS AND INFORMATION PROCESSING SYSTEM

(75) Inventors: Yoshinao Kitahara, Suwa (JP); Kenji Sakuda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 535 days.

(21) Appl. No.: 12/633,068

(22) Filed: Dec. 8, 2009

(65) Prior Publication Data

US 2010/0141989 A1      Jun. 10, 2010

(30) Foreign Application Priority Data

Dec. 10, 2008   (JP) ................. 2008-314455

(51) Int. Cl.
*G06F 15/00* (2006.01)
*G06F 15/177* (2006.01)
(52) U.S. Cl. ...................... 358/1.15; 709/220
(58) Field of Classification Search .................. 358/1.15
See application file for complete search history.

(56) References Cited

U.S. PATENT DOCUMENTS

| | | | |
|---|---|---|---|
| 6,608,553 B2 | 8/2003 | Isobe | |
| 2006/0195552 A1 | 8/2006 | Nampei | |
| 2007/0086041 A1* | 4/2007 | Richtsmeier | 358/1.15 |
| 2010/0141983 A1* | 6/2010 | Sorrentino et al. | 358/1.15 |

FOREIGN PATENT DOCUMENTS

| | | |
|---|---|---|
| JP | 2002-104137 A | 4/2002 |
| JP | 2006-268845 A | 10/2006 |
| JP | 2008-131105 A | 6/2008 |

* cited by examiner

*Primary Examiner* — Saeid Ebrahimi Dehkordy
(74) *Attorney, Agent, or Firm* — Kilpatrick Townsend & Stockton LLP (57) ABSTRACT

An electronic apparatus includes a host controller that serves as a wireless USB host, one or more information processing units that have the function of a wireless USB device that can perform wireless communication with the host controller, a communication unit that can communicate with another electronic apparatus, and a control unit that acquires from the host controller connection information that is information on whether or not the host controller and the information processing unit requested for connection are connected to each other and whether or not the connection can be cut off when a connection request for one information processing unit out of the one or more information processing units is received from the another electronic apparatus through the communication unit, permits connection of the another electronic apparatus and the information processing unit requested to be connected to through wireless communication in a case where the host controller and the information processing unit requested for connection are not connected to each other.

6 Claims, 3 Drawing Sheets

FIG. 1

ELECTRONIC APPARATUS AND INFORMATION PROCESSING SYSTEM

This application claims priority to Japanese Patent Application No. 2008-314455, filed Dec. 10, 2008 the entirety of which is incorporated by reference herein.

BACKGROUND

1. Technical Field

The present invention relates to an electronic apparatus and an information processing system.

2. Related Art

Connection between devices can be switched in an easy manner without having cable connections or changing the connection by connecting a plurality of devices through wireless communication. For example, in JP-A-2006-268845, technology allowing a user to easily perform a connection switch by displaying connection or non-connection of peripheral devices to each host device in a case where a plurality of host devices is connected through wireless communication has been described.

However, in the peripheral device disclosed in JP-A-2006-268845, a user needs to determine which one out of a plurality of host devices is selected. Accordingly, for example, in a case where a user computer and a plurality of printers can be connected to each other, the user needs to acquire the functions included in each printer and then needs to select and designate a printer that can perform the desired printing. In addition, when the user notices that a printer does not include the function for performing the desired printing after directing the printer to print, the user needs to select another printer.

SUMMARY

An advantage of some aspects of the invention is that it provides an electronic apparatus and an information processing system capable of increasing the possibility that a user can perform a desired process even in a case where the user does not acquire the processes that can be performed by the electronic apparatuses.

The invention employs the following means.

According to a first aspect of the invention, there is provided an electronic apparatus including: a host controller that serves as a wireless USB host; one or more information processing units that have the function of a wireless USB device that can perform wireless communication with the host controller; a communication unit that can communicate with another electronic apparatus; and a control unit that acquires from the host controller connection information that is information on whether or not the host controller and the information processing unit requested for connection are connected to each other and whether or not the connection can be cut off when a connection request for one information processing unit out of the one or more information processing units is received from the another electronic apparatus through the communication unit, permits connection of the another electronic apparatus and the information processing unit requested to be connected to through wireless communication in a case where the host controller and the information processing unit requested for connection are not connected to each other, and permits connection of the another electronic apparatus and the information processing unit requested for connection through wireless communication after the connection of the host controller and the information processing unit requested for connection is cut off in a case where the host controller and the information processing unit requested for connection are connected to each other and the connection can be cut off.

According to the above-described electronic apparatus, a host controller that serves as a wireless USB host and one or more information processing units that have the function of a wireless USB device that can perform wireless communication with the host controller are included. When a connection request for one information processing unit out of the one or more information processing units is received from the another electronic apparatus through the communication unit, the electronic apparatus acquires the connection information that is information on whether or not the host controller and the information processing unit requested to be connected to are connected to each other and whether or not the connection can be cut off from the host controller. When the host controller and the information processing unit requested to be connected to are not connected to each other, the electronic apparatus permits the connection of the another electronic apparatus and the information processing unit requested for connection through wireless communication. On the other hand, when the host controller and the information processing unit requested to be connected to are connected to each other and the connection thereof can be cut off, the electronic apparatus permits the connection of the another electronic apparatus and the information processing unit requested to be connected to through wireless communication after the connection of the host controller and the information processing unit requested to be connected to is cut off. Accordingly, when the information processing unit is not connected to the host controller, a connection between the another electronic apparatus and the information processing unit can be permitted. Thus, in a case where another electronic apparatus requested to perform a process by the user cannot perform the process, the possibility that the process requested by the user can be performed by connecting to one information processing unit of the above-described electronic apparatus is increased. Accordingly, even when the user does not acquire the processes that can be performed by the electronic apparatuses, the possibility that the user can perform a desired process can be increased.

In the above-described electronic apparatus, in a case where the control unit receives a request for acquiring function specifying information that can be used for specifying the function of the electronic apparatus from the another electronic apparatus through the communication unit before receiving the connection request for one out of the one or more information processing units from the another electronic apparatus through the communication unit, the control unit may be configured to reply with the function of the one or more devices included in the electronic apparatus to another electronic apparatus as the function specifying information. In such a case, it can be determined on the side of another electronic apparatus whether or not a connection request of the information processing unit of the above-described electronic apparatus is to be transmitted based on the function specifying information.

According to a second aspect of the invention, there is a provided an electronic apparatus including: a host controller that serves as a wireless USB host; one or more information processing units; a communication unit that can communicate with another electronic apparatus; an input unit that receives an information processing request; a determination unit that, when an information processing request is received, determines whether or not a process requested by the information processing request can be performed by any of the one or more information processing units that are included in the electronic apparatus; and a control unit that performs the process according to the information processing request by using the electronic apparatus in a case where the determination result of the determination unit is a positive determination and transmits connection requests to several information processing units that are included in the another electronic apparatus through the communication unit, waits for permission of connection of the information processing unit, connects the host controller and the information processing unit to which a connection to each other is permitted through wireless communication, and performs the process according to the information processing request by using the information processing unit, in a case where the determination result of the determination unit is a negative determination.

In the above-described electronic apparatus, when the input unit receives an information processing request, it is determined whether or not a process requested by the information processing request can be performed by any of the one or more information processing units that are included in the electronic apparatus. In a case where the determination result is positive, the process requested by the information processing request is performed by using the electronic apparatus. On the other hand, in a case where the determination result is negative, the electronic apparatus transmits a connection request to one information processing unit included in the another electronic apparatus through the communication unit that can communicate with the another electronic apparatus, waits for permission of connection of the information processing unit, connects the host controller serving as the wireless USB host and the information processing unit to which a connection to each other is permitted through wireless communication, and allows the process requested by the information processing request to be performed by the information processing unit. Accordingly, even in a case where the received information processing request cannot be performed by the above-described electronic apparatus, the received information processing request can be performed by connecting the host controller and the information processing unit of the another electronic apparatus to each other. As a result, even when the user does not acquire the processes that can be performed by the electronic apparatuses, the possibility that the user can perform a desired process can be increased.

In the above-described electronic apparatus, it may be configured that the control unit transmits a request for acquiring the function specifying information that can be used for specifying the function of the another electronic apparatus to the another electronic apparatus through the communication unit in a case where the determination result of the determination unit is negative, then, determines whether or not the process requested by the information processing request can be performed by another electronic apparatus based on the function specifying information received from the another electronic apparatus. In a case where the determination result is positive, the above-described electronic apparatus transmits the connection request of the information processing unit of the another electronic apparatus that can perform the process requested by the information processing request through the communication unit, waits for permission of the connection of the information processing unit, connects the host controller and the information processing unit for which the connection is permitted through wireless communication, and performs the process according to the information processing request by using the information processing unit. In such a case, since the connection request is transmitted only to the information processing unit that can perform the process requested by the received information processing request, the connection request can be transmitted more appropriately.

According to a third aspect of the invention there is provided an information processing system that includes the electronic apparatus of the first aspect and the electronic apparatus of the second aspect.

According to the above-described information processing system, the above-described electronic apparatuses of the first and second aspects are included. Therefore, the above-described advantages, that is, an advantage that, even when the user does not acquire the processes that can be performed by the electronic apparatus of the second aspect, the possibility that the user can perform a desired process can be increased by connecting the host controller of the electronic apparatus of the second aspect and one information processing unit of the electronic apparatus of the first aspect to each other, and an advantage that the electronic apparatus of the first aspect replies the function specifying information to the electronic apparatus of the second aspect, and the connection request can be transmitted only to the information processing unit that can perform the process according to the information processing request received by the electronic apparatus of the second aspect, and accordingly, the connection request can be transmitted more appropriately can be acquired.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
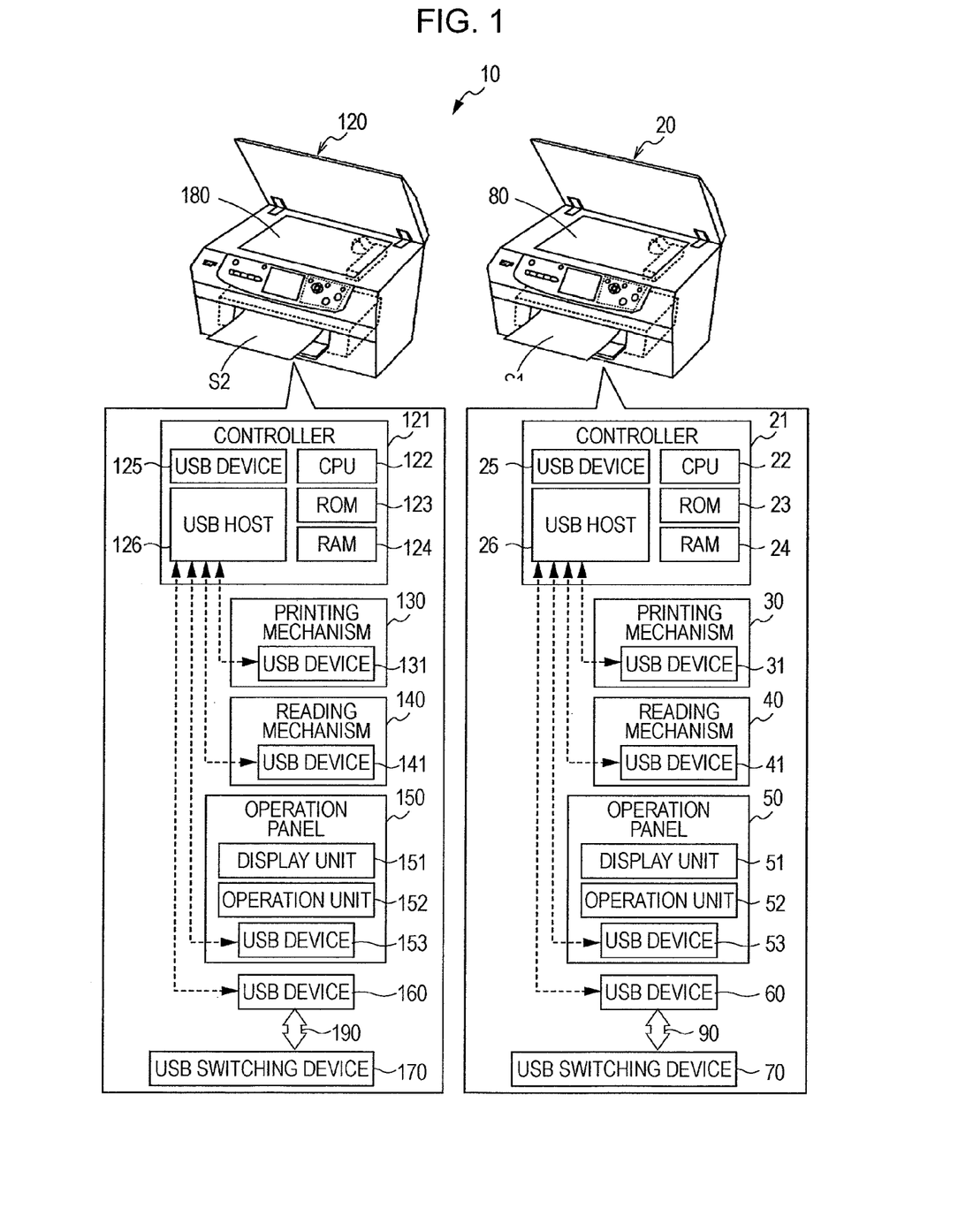
FIG. 1 is a diagram showing the configuration of a wireless USB system according to an embodiment of the invention.

Next, an embodiment of the invention will be described with reference to the accompanying drawings. FIG. 1 is a schematic diagram showing the configuration of a wireless USB system 10 according to an embodiment of the invention. The wireless USB system 10 according to this embodiment has a communication function using wireless USB that is a communication specification through wireless communication by using UWB (Ultra Wide Band). The wireless USB system 10 is configured by multifunction devices 20 and 120 that can print image data or read out an image.

The multifunction device 20 includes a controller 21 that is responsible for the entirety of the device, a printing mechanism 30 that performs printing on a recording sheet S1, a reading mechanism 40 that reads out a document placed on a glass board 80, an operation panel 50 that can display information to a user and can receive a user's direction, a USB device 60 that can communicate with the controller 21 through wireless USB, and a USB switching device 70 that is connected to the USB device 60 through a bus 90. In addition, the controller 21 is configured to be able to communicate with the printing mechanism 30, the reading mechanism 40, the operation panel 50, and the USB device 60 through wireless USB.

The controller 21 is configured by a microprocessor that has a CPU 22 as its core component and includes a ROM 23 in which various processing programs are stored, a RAM 24 in which data is temporarily stored, and a USB device 25 and a USB host 26 that can transmit or receive information in a wireless manner. The USB device 25 can transmit or receive data to or from an external device (for example, a user computer) not shown in the figure and can receive a direction from a user. The USB host 26 can transmit or receive information to or from a USB device 31 included in the printing mechanism 30, a USB device 41 included in the reading mechanism 40, a USB device 53 included in the operation panel 50, and the USB device 60 in a wireless manner. Accordingly, the controller 21 can control the printing mechanism 30, the reading mechanism 40, the operation panel 50, and the USB device 60 by transmitting control signals thereto or receive information.

The printing mechanism 30, although not shown in the figure, is an ink jet-type mechanism that performs a printing process by applying pressure to ink of each color and ejecting the pressurized ink onto a recording sheet S1. A mechanism that applies pressure to the ink may be configured to use the transformation of a piezoelectric element or generation of air bubbles caused by heating with a heater. This printing mechanism 30 performs wireless communication with the controller 21 by using the USB device 31. In addition, this printing mechanism 30 can perform printing for a paper sheet of a size up to a maximum of A4 and double-sided printing.

The reading mechanism 40 is configured by a general full-color scanning mechanism that reads a document placed on the glass board 80 into image data. This reading mechanism 40 includes a general color image sensor that emits light toward the document and then resolves the reflected light into light of colors of red (R), green (G), and blue (B) so as to generate read-out data. This reading mechanism 40 performs wireless communication with the controller 21 by using the USB device 41.

The operation panel 50 is a device for a user to input various directions to the multifunction device 20. In the operation panel 50, a display unit 51 in which the characters or images according to various directions are displayed, an operation unit 52 to which a user's direction can be input by using various buttons, and the like are disposed. This operation panel 50 performs wireless communication with the controller 21 by using the USB device 53.

The USB device 60 is a device that is connected to the USB host 26. The USB device 60 transmits information received from the USB host 26 to the USB switching device 70 through the bus 90 or transmits information received from the USB switching device 70 to the USB host 26. In addition, the USB device 60 acquires the communication states of the USB host 26 and the USB devices 31, 41, and 53 from the USB host 26 for each predetermined time (for example, several tens of milliseconds) and stores the latest communication states.

The USB switching device 70 is a device that can be connected to another multifunction device (in this embodiment, a multifunction device 120) other than the multifunction device 20. The USB switching device 70 can transmit or receive information to or from another multifunction device or transmit or receive information to or from the USB device 60 through the bus 90, which will be described later in detail. In addition, the USB switching device 70 stores the function information that is, information on the functions of the multifunction device 20. Such function information, for example, includes information such as the size of a paper sheet that can be printed by the printing mechanism 30 or the availability of double-sided printing thereof.

The multifunction device 120 includes the same constituent elements as those of the multifunction device 20. Thus, reference signs for the constituent elements of the multifunction device 120 are values acquired by adding 100 to the reference signs for the constituent elements of the multifunction device 20, and a description thereof is omitted here. However, differently from the printing mechanism 30, the printing mechanism 130 can perform printing on a paper sheet of a size up to a maximum of A3 and cannot perform double-sided printing. In addition, the USB switching device 170 can be connected to other multifunction devices (in this embodiment, the multifunction device 20) other than the multifunction device 120.

Here, communication through the wireless USB will be described. In the wireless USB, wireless communication is performed between hosts (in this embodiment, USB hosts 26 and 126) and devices (in this embodiment, USB devices 25, 31, 41, 53, 60, 70, 125, 131, 141, 153, 160, and 170). In order to allow the hosts and the devices to communicate with each other through the wireless USB, first, connection context information (hereinafter, referred to as CC information) according to a communication destination needs to be shared with each other in advance. In the CC information, information needed for performing communication, for example, unique IDs and connection keys of the hosts and the devices that perform communication are included. As a method for sharing the CC information, there are a USB cable method (Out of Band Method) in which the CC information is shared by connecting both parties through a USB cable and a numeric method (In Band Method) in which the CC information is shared by using the UWB through wireless communication. Among the hosts and the devices that share the CC information with one another, connections are set up by checking and sharing of a same connection key through a four-way handshake for initiating the secured communication. In addition, the host can set up connections to a plurality of the devices, and the host can perform communication with a plurality of the devices in parallel by allocating signal transmission time and signal reception time for each of the devices. On the other hand, the device can set up a connection with only one host at a time. In this embodiment, it is assumed that a host and a device for which a connection needs to be set up have completed sharing the CC information in advance. The USB host 26 sets up connections to the USB devices 31, 41, 53, and 60 all the time so as to maintain idling states, and the USB host 126 sets up connections to the USB devices 131, 141, 153, and 160 all the time so as to maintain idling states, whereby information can be transmitted and received immediately as needed. In addition, each of the USB devices 31 and 131 shares the CC information with any one of the USB hosts 26 and 126, and accordingly, setup of a connection between the USB host 26 and the USB device 131 or setup of a connection between the USB host 126 and the USB device 31 can be made. In addition, the USB devices 31 and 131 assign priority levels to the CC information. In particular, the USB device 31 assigns the highest priority level to the CC information that is shared with the USB host 26, and the USB device 131 assigns the highest priority level to the CC information that is shared with the USB host 126. When the host corresponding to the CC information having the highest priority level is in a communicatable state, each of the USB device 31 and 131 is configured to perform setup a connection to the host with priority.

Next, the operation of the wireless USB system 10 according to this embodiment that is configured as described above, particularly, the operation for the case where a user directs the multifunction device 20 to print will be described.

Figure 2:
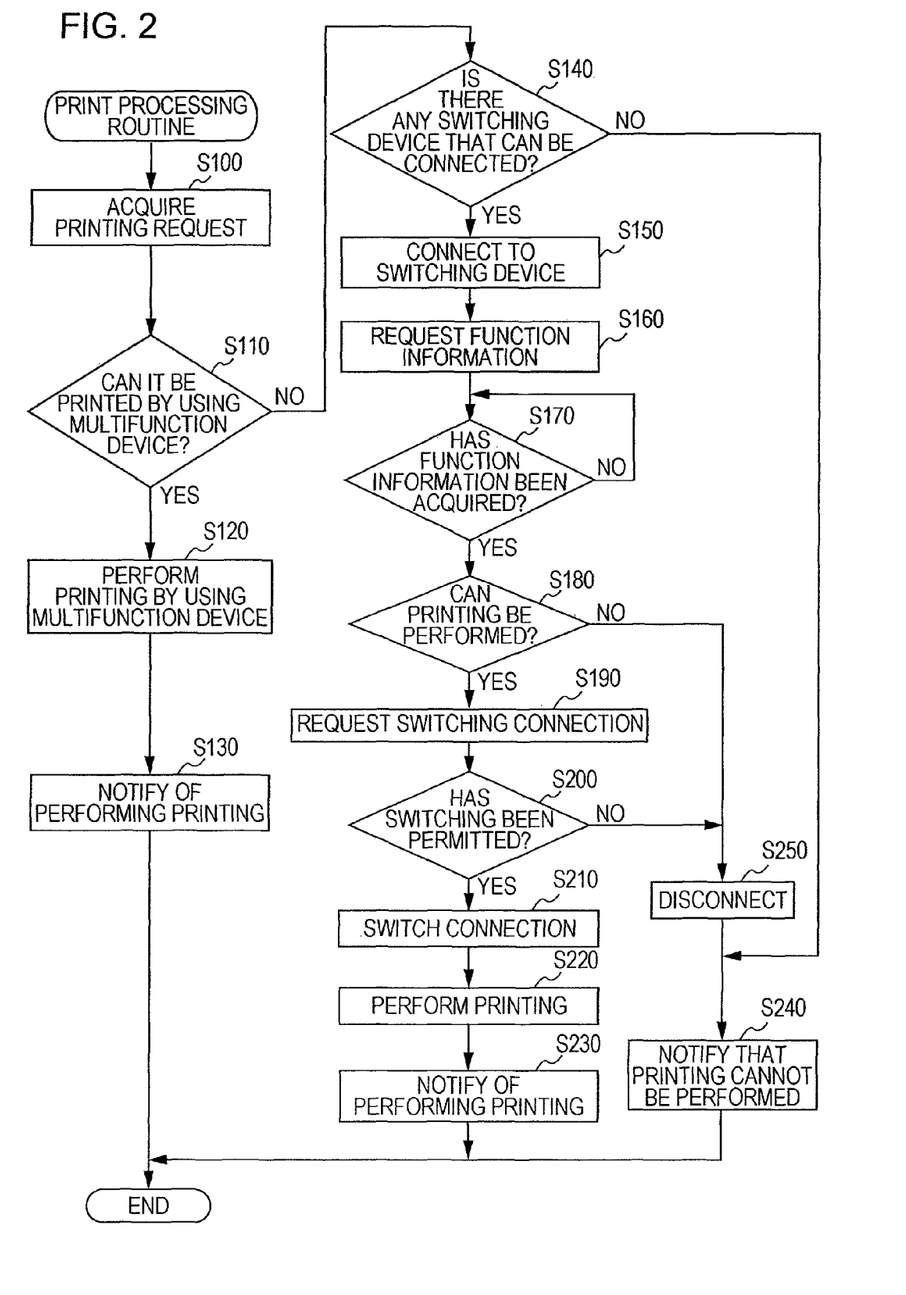
FIG. 2 is a flowchart showing an example of a print processing routine.

First, the operation of the multifunction device 20 will be described. FIG. 2 is a flowchart showing an example of a print processing routine. This routine is performed by the CPU 22 when a connection between the USB device 25 of the multifunction device 20 and the USB host of a user computer not shown in the figure is set up through the wireless USB and the user directs the multifunction device 20 to print the designated image data by operating the user computer. When this print processing routine is performed, the CPU 22, firstly acquires a print request from the USB host of the user computer through the USB device 25 (Step S100) and determines whether or not the print request can be processed by the multifunction device 20 (Step S110). Here, a "print request" is information that includes information for designating the size of a paper sheet to be used for the printing, need for double-sided printing, and the like. When a positive determination is made in Step S110, the CPU 22 controls the printing mechanism 30 to perform printing of the image data designated by the user (Step S120). In particular, the CPU 22 acquires the image data designated by the user through the USB device 25, stores the image data in the RAM 24, creates print data that can be printed by the printing mechanism 30 based on the stored image data, and transmits the print request and the print data from the USB host 26 to the USB device 31, whereby controlling printing of the print data onto a recording sheet S1. Accordingly, the image data designated by the user is printed on the recording sheet S1 in accordance with the print request. Then, the CPU 22 notifies the USB host of the user computer of performing printing by using the multifunction device 20 through the USB device 25 (Step S130), and this routine ends.

On the other hand, when a negative determination is made in Step S110, the CPU 22 determines whether or not there is any USB switching device that can be connected to a different multifunction device (Step S140). In particular, the USB host 26 transmits a connection request to the USB switching device having the CC information in advance, that is, the USB switching device 170 of the multifunction device 120, and the determination is made based on whether or not a reply indicating that the connection can be made is received within a predetermined time. When a negative determination is made in Step S140, printing on the basis of the print request cannot be performed. Accordingly, the USB device 25 transmits information indicating that printing cannot be performed to the USB device of the user computer (Step S240), and this routine ends.

On the other hand, when a positive determination is made in Step S140, a connection between the USB host 26 and the USB switching device 170 is set up by four-way handshaking (Step S150), and the CPU 22 requests the USB switching device 170 to transmit the function information on the multifunction device 120 (Step S160). Then, the CPU 22 waits until the function information is acquired from the USB switching device 170 (Step S170). When acquiring the function information, the CPU 22 determines whether or not the printing mechanism 130 of the multifunction device 120 can process the print request acquired in Step S100 based on the acquired function information (Step S180).

On the other hand, when a positive determination is made in Step S180, the CPU 22 directs the USB host 26 to transmit a connection switching request for cutting off the connection to the USB switching device 170 and setting up a connection to the USB device 131 of the printing mechanism 130 to the USB switching device 170 (Step S190) and determines whether or not the connection switching is permitted (Step S200). Then, when a positive determination is made in Step S200, the CPU 22 directs the USB host 26 to cut off the connection to the USB switching device 170 and set up a connection to the USB device 131 of the printing mechanism 130 by four-way handshaking (Step S210) and controls the printing mechanism 130 to perform printing of the image data designated by the user after the connection is set up (Step S220). In particular, the CPU 22 acquires the image data designated by the user through the USB device 25, stores the image data in the RAM 24, creates the print data that can be printed by the printing mechanism 130 based on the store image data, and transmits the print request and the print data from the USB host 26 to the USB device 131 so as to control the USB device 131 to print the image data onto the recording sheet S2. Then, the CPU 22 notifies the USB host of the user computer that printing is performed by the multifunction device 120 through the USB device 25 (Step S230), and this routine ends. Accordingly, even when a print request that cannot be processed by the printing mechanism 30, for example, a print request for A3-size printing is made, printing can be performed by allowing the printing mechanism 130 that can perform A3-size printing to perform printing, whereby printing as designated by the user can be performed.

On the other hand, when a negative determination is made in any one of Steps S180 and S210, printing on the basis of the print request cannot be performed. Accordingly, in such a case, the connection to the USB switching device 170 is cut off (Step S250), the process of Step S240 is performed, and this routine ends.

Figure 3:
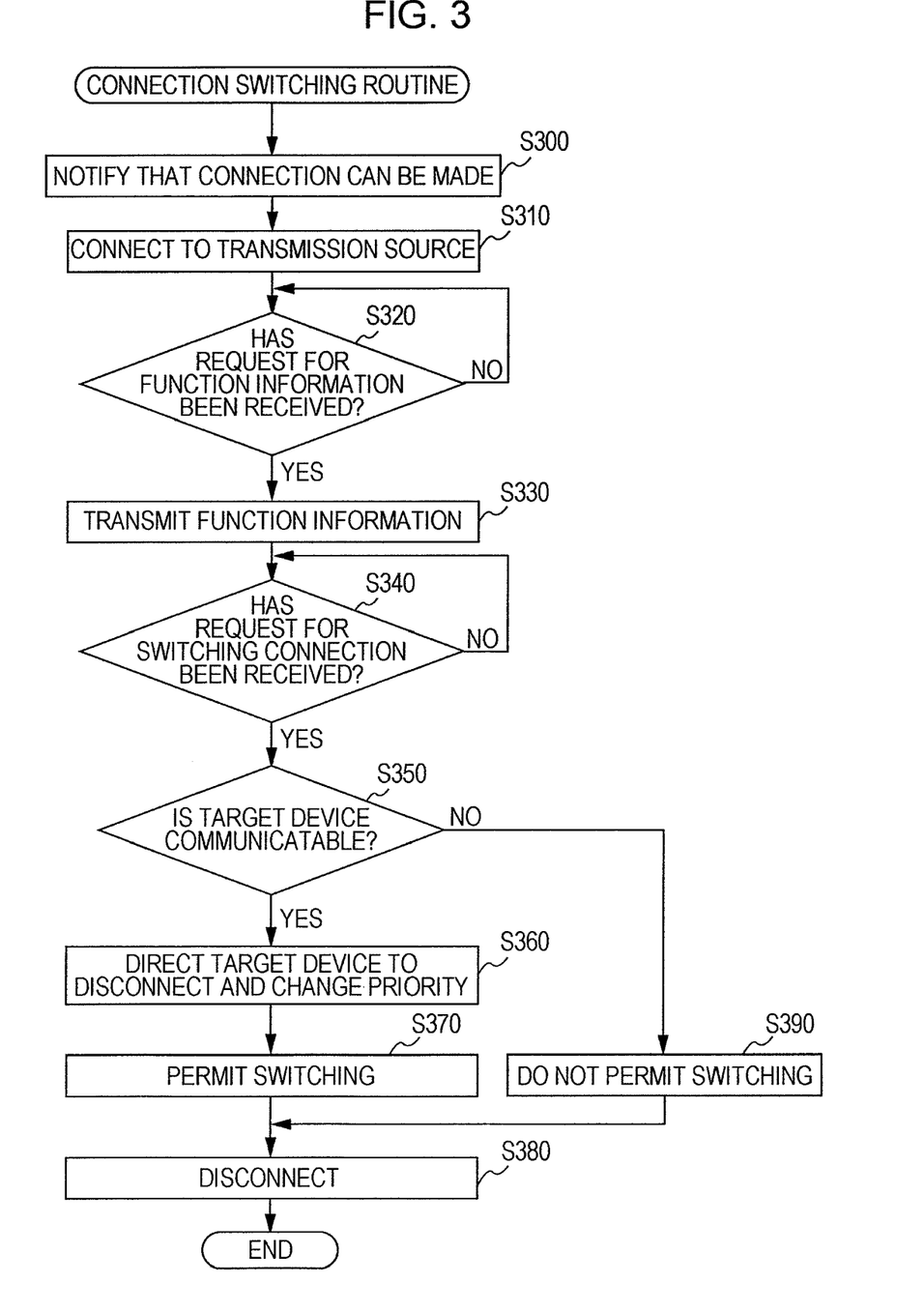
FIG. 3 is a flowchart showing an example of a connection switching routine.

Next, the operation of the multifunction device 120 will be described. FIG. 3 is a flowchart showing an example of a connection switching routine. This routine is performed by the USB switching device 170 when the connection request transmitted by the USB host 26 in Step S140 of the above-described print processing routine is received by the USB switching device 170. When this routine is performed, firstly the USB switching device 170 transmits a reply indicating that the connection can be made to the USB host 26 that is, the transmission source of the connection request (Step S300). Then, the USB switching device 170 sets up a connection to the USB host 26 by four-way handshaking (Step S310). This is a process corresponding to Step S150 of the above-described print processing routine. Then, when the connection is set up, the USB switching device 170 waits to receive the request for transmitting the function information that is transmitted by the USB host 26 in Step S160 of the above-described print processing routine (Step S320). When receiving the request for transmitting the function information, the USB switching device 170 transmits the stored function information to the USB host 26 (Step S330). Accordingly, a positive determination is made in Step S170 of the above-described print processing routine.

Subsequently, the USB switching device 170 waits to receive the connection switching request from the USB host 26 (Step S340). When receiving the connection switching request, the USB switching device 170 checks whether or not the device requested for connection by the connection switching request is in the state that the device can communicate with the USB host 26 (S350). In other words, when receiving the connection switching request for setting up a connection to the USB device 131 in Step S190 of the above-described print processing routine, the USB switching device 170 acquires the communication state of the USB host 126 and the USB device 131 from the USB device 160. When the communication state is the idling state, a positive determination is made. On the other hand, when the USB host 126 and the USB device 131 are in the middle of the process for transmitting and receiving information, for example, when the printing mechanism 30 is controlled to perform printing by the CPU 22, a negative determination is made.

When a positive determination is made in Step S350, the USB switching device 170 directs the USB device 131 to cut off the connection to the USB host 126 and set a host having the highest priority level as the USB host 26 through the bus 190, the USB device 160, and the USB host 126 (Step S360). Accordingly, the USB device 131 can cut off the connection to the USB host 126 and set up a connection to the USB host 26 by changing the priority level. Then, the USB switching device 170 transmits permission for the connection switching to the USB host 26 (Step S370) and cuts off the connection to the USB host 26 (Step S380), and this routine ends. By performing the process of Step S370, a positive determination is made in Step S200 of the above-described print processing routine, the USB host 26 cuts off the connection to the USB switching device 170 in Step S210 and sets up a connection to the USB device 131 by four-way handshaking. Accordingly, the printing process as described above can be performed. On the other hand, when a negative determination is made in Step S350, the USB switching device 170 transmits information indicating no permission for the connection switching to the USB host 26 (Step S390). Accordingly, the process proceeds to Step S380 so as to cut off the connection, and this routine ends. By performing the process of Step S390, a negative determination is made in Step S200 of the above-described print processing routine.

In the description above, the operation for the case where the user computer directs the multifunction device 20 to perform printing has been described. However, the print processing routine can be also performed by the CPU 122, and the connection switching routine can be also performed by the USB switching device 70. Thus, for example, when the USB device 125 of the multifunction device 120 sets up the connection to the user computer by using the wireless USB, and the user directs the multifunction device 120 to print the designated image data on an A4-size sheet as double-sided printing by operating the user computer, it may be configured that the CPU 122 performs the print processing routine, and the USB switching device 70 performs the connection switching routine. Accordingly, in such a case, the CPU 122 allows the printing mechanism 30, which can perform double-sided printing on an A4-size sheet, to perform printing, whereby printing as designated by the user can be performed.

Here, in a case where the user computer directs the multifunction device 20 to perform printing, the correspondence relationship between the constituent elements of this embodiment and the constituent elements of an embodiment of the invention will be clarified. The USB host 126 according to this embodiment corresponds to a host controller of a first electronic apparatus according to an embodiment of the invention, and the USB host 26 according to this embodiment corresponds to a communication unit and a host controller of a second electronic apparatus according to an embodiment of the invention. In addition, the printing mechanism 130 and the reading mechanism 140 according to this embodiment correspond to an information processing unit of the first electronic apparatus according an embodiment of the invention, and the printing mechanism 30 and the reading mechanism 40 according to this embodiment correspond to an information processing unit of the second electronic apparatus according to an embodiment of the invention. Furthermore, the USB switching device 170 according to this embodiment corresponds to a communication unit and a control unit of the first electronic apparatus according to an embodiment of the invention, the USB device 25 according to this embodiment corresponds to an input unit according to an embodiment of the invention, and the CPU 22 according to this embodiment corresponds to a determination unit and a control unit of the second electronic apparatus according to an embodiment of the invention.

According to the embodiment described as above in detail, when the user performs a print request to the multifunction device 20, even in a case where the printing mechanism 30 of the multifunction device 20 cannot perform printing as requested by the print request, the USB switching device 170 directs to cut off the connection for a case where the USB device 131 and the USB host 126 are in the idling state. Accordingly, a connection can be set up between the printing mechanism 130 of the multifunction device 120 and the controller 21 by using the wireless USB. Therefore, even when the user does not acquire a process that can be performed by the multifunction device 20, the possibility of performing the process desired to be performed by the user can be increased. In addition, since the USB switching device 170 transmits the function information to the USB host 26, it can be determined in advance whether or not the printing as requested by the print request can be performed by using the function of the printing mechanism 130. Accordingly, the USB host 26 can appropriately transmit the connection switching request by using the USB switching device 170.

In addition, the invention is not limited to the above-described embodiment at all. Furthermore, it is apparent that the invention can be performed in various forms as long as it belongs to the technical scope of the invention.

For example, in the above-described embodiment, the transmission and reception of the function information is performed in Steps S160 and S170 of the print processing routine and Steps S320 and S330 of the connection switching routine. However, the transmission and reception of the function information may be omitted. In other words, in the print processing routine, it may be configured that the process proceeds to Step S190 after Step S150, the connection switching to the printing mechanism 130 is requested, and whether or not printing can be performed is determined by transmitting a print request to the printing mechanism 130 after connection is switched in Step S210. In such a case, the CC information shared by the USB device 131, the USB host 26, the USB switching device 170, and the USB host 26 and the function information on the printing mechanism 130 may be configured to be stored in the ROM 23 of the multifunction device 20 so as to be associated with each other in advance. In the case, when a negative determination is made in Step S110, whether or not the printing mechanism 130 can process the print request is determined based on the function information stored in the ROM 23. On the other hand, when a positive determination is made, the process proceeds to Step S140, and whether or not the connection can be made is determined by transmitting a connection request to the USB switching device 170 by using the CC information corresponding to the function information.

In the above-described embodiment, the USB devices 31 and 131 place priority on setting up a connection to the host corresponding to the CC information having the highest priority level. However, it may be configured that the priority levels are not set, and a connection to a host that transmits the connection request first is set up.

In the above-described embodiment, the USB host 126 sets up connections to the USB devices 131, 141, 153, and 160 all the time so as to maintain the idling state. However, there may be a time when a connection is not set up without maintaining the idling state all the time. In addition, it may be configured that the connection is set up only when transmission and reception of information need to be performed between the USB host 126 and the USB devices 131, 141, 153, and 160 such as when the CPU 122 controls the printing mechanism 130 to perform printing. In such case, in Step S350 of the connection switching routine, it may be checked whether or not the communication state between the USB host 126 and the USB device 131 is either a connection state or a disconnection state and whether or not the communication state is either the idling state or the information transmission and reception state in the case of the connection state. In the case, when the communication state is the disconnection state or the idling state, a positive determination may be configured to be made so as to proceed to Step S360. On the other hand, when the communication state is the information transmission and reception state, a negative determination is made so as to proceed to Step S390. In addition, in such a case, the USB device 131 may be configured to set up a connection to a host that transmits the connection request first without setting the priority levels. In this case, the USB host 126 and the USB device 131 are disconnected from each other in Step S360, and the USB host 126 is directed not to transmit the connection request to the USB device 131.

In the above-described embodiment, the USB switching device 170 transmits the function information in Step S330 of the connection switching routine. However, the acquired communication state between the USB host 126 and the USB device 131 may be configured to be transmitted together with the function information in Step S350. In such a case, it can be additionally determined whether or not the USB host 26 is in the state in which the USB host 26 can be connected to the USB device 131 in Step S180 of the print processing routine, and accordingly, an unnecessary connection switching request is not transmitted in Step S190.

In the above-described embodiment, the USB switching device 170 and the USB host 26 communicate with each other by using the wireless USB. However, the USB switching device 170 and the USB host 26 may be configured to communicate with each other by using a wired USB. In such a case, the controller 21 may include a USB host that communicates with the USB switching device 170 by using the wired USB, separately from the USB host 26. In addition, the USB devices 25 and 125 may be configured to perform data transmission and date reception for external devices by using the wired USB.

In the above-described embodiment, the wireless USB system 10 includes two multifunction devices 20 and 120. However, the wireless USB system 10 may be configured to include three multifunction devices or more by adding multifunction devices having the same configuration. As the number of the multifunction devices is increased, the possibility that the process requested by the user can be performed is increased further. In such a case, when a negative determination is made in Step S180 or S200, it may be configured that the process proceeds to Step S140 after the connection to the USB switching device is cut off in Step S250, and whether or not there is any USB switching device that can be connected to other multifunction devices is determined. In addition, instead of the multifunction device, the wireless USB system 10 may be configured by a printer that does not include a reading device.

In the above-described embodiment, wireless communication according to the wireless USB communication specification is performed. However, wireless communication of a different specification may be configured to be performed.

In the above-described embodiment, the multifunction devices 20 and 120 and the wireless USB system 10 have been described as electronic apparatuses and an information processing system according to embodiments of the invention. However, the invention is not limited to the multifunction device that performs a printing process, and any electronic apparatus including an information processing unit that performs information processing may be used.

What is claimed is:

1. An electronic apparatus comprising:
a host controller that serves as a wireless communication host;
one or more information processing units that have the function of a wireless communication device that can perform wireless communication with the host controller;
a communication unit that can communicate with another electronic apparatus; and
a control unit that acquires from the host controller connection information that is information on whether or not the host controller and the information processing unit requested for connection are connected to each other and whether or not the connection can be cut off when a connection request for one information processing unit out of the one or more information processing units is received from the another electronic apparatus through the communication unit, permits connection of the another electronic apparatus and the information processing unit requested to be connected to through wireless communication in a case where the host controller and the information processing unit requested for connection are not connected to each other, and permits connection of the another electronic apparatus and the information processing unit requested for connection through wireless communication after the connection of the host controller and the information processing unit requested for connection is cut off in a case where the host controller and the information processing unit requested for connection are connected to each other and the connection can be cut off.

2. The electronic apparatus according to claim 1, wherein, when the control unit receives a request for acquiring function specifying information that can be used for specifying the function of the electronic apparatus from the another electronic apparatus through the communication unit before receiving the connection request for one out of the one or more information processing units from the another electronic apparatus through the communication unit, the control unit replies with the function of the one or more devices included in the electronic apparatus to the another electronic apparatus as the function specifying information.

3. An electronic apparatus comprising:
a host controller that serves as a wireless communication host;
one or more information processing units;
a communication unit that can communicate with another electronic apparatus;
an input unit that receives an information processing request;
a determination unit that, when an information processing request is received, determines whether or not a process requested by the information processing request can be performed by one of the one or more information processing units that are included in the electronic apparatus; and
a control unit that performs the process according to the information processing request by using the electronic apparatus in a case where the determination result of the determination unit is positive and transmits connection requests to several information processing units that are included in the another electronic apparatus through the communication unit, waits for permission of connection of the information processing unit, connects the host controller and the information processing unit to which a connection is permitted to each other through wireless communication, and performs the process according to the information processing request by using the information processing unit, in a case where the determination result of the determination unit is a negative determination.

4. The electronic apparatus according to claim 3, wherein the control unit transmits a request for acquiring function specifying information that can be used for specifying the function of the another electronic apparatus to the another electronic apparatus through the communication unit in a case where the determination result of the determination unit is a negative determination, then, determines whether or not the process requested by the information processing request can be performed by the another electronic apparatus based on the function specifying information received from the another electronic apparatus, transmits the connection request of the information processing unit of the another electronic apparatus that can perform the process requested by the information processing request through the communication unit, waits for permission of the connection of the information processing unit, connects the host controller and the information processing unit for which the connection is permitted through wireless communication, and performs the process according to the information processing request by using the information processing unit, in a case where the determination result is a positive determination.

5. An information processing system comprising: an electronic apparatus comprising:
   a host controller that serves as a wireless communication host;
   one or more information processing units that have the function of a wireless communication device that can perform wireless communication with the host controller;
   a communication unit that can communicate with another electronic apparatus;
   an input unit that receives an information processing request;
   a determination unit that, when an information processing request is received, determines whether or not a process requested by the information processing request can be performed by one of the one or more information processing units that are included in the electronic apparatus; and
   a control unit that acquires from the host controller connection information that is information on whether or not the host controller and the information processing unit requested for connection are connected to each other and whether or not the connection can be cut off when a connection request for one information processing unit out of the one or more information processing units is received from the another electronic apparatus through the communication unit, permits connection of the another electronic apparatus and the information processing unit requested to be connected to through wireless communication in a case where the host controller and the information processing unit requested for connection are not connected to each other, and permits connection of the another electronic apparatus and the information processing unit requested for connection through wireless communication after the connection of the host controller and the information processing unit requested for connection is cut off in a case where the host controller and the information processing unit requested for connection are connected to each other and the connection can be cut off; wherein the control unit also performs the process according to the information processing request by using the electronic apparatus in a case where the determination result of the determination unit is positive and transmits connection requests to several information processing units that are included in the another electronic apparatus through the communication unit, waits for permission of connection of the information processing unit, connects the host controller and the information processing unit to which a connection is permitted to each other through wireless communication, and performs the process according to the information processing request by using the information processing unit, in a case where the determination result of the determination unit is a negative determination.

6. The information processing system of claim 5 further comprising: the electronic apparatus according to claim 2; and
   the electronic apparatus according to claim 4.

* * * * *